(12) United States Patent  
Maddah et al.

(10) Patent No.: US 9,355,459 B2
(45) Date of Patent: May 31, 2016

(54) METHOD AND SYSTEM FOR CHARACTERIZING CELL MOTION

(71) Applicant: Cellogy, Inc., Menlo Park, CA (US)

(72) Inventors: Seyyedeh Mahnaz Maddah, Menlo Park, CA (US); Kevin Loewke, Menlo Park, CA (US)

(73) Assignee: Cellogy, Inc., Menlo Park, CA (US)

( * ) Notice: Subject to any disclaimer, the term of this patent is extended or adjusted under 35 U.S.C. 154(b) by 147 days.

(21) Appl. No.: 14/260,087

(22) Filed: Apr. 23, 2014

(65) Prior Publication Data

US 2015/0213614 A1 Jul. 30, 2015

Related U.S. Application Data

(60) Provisional application No. 61/948,449, filed on Mar. 5, 2014, provisional application No. 61/946,087, filed on Feb. 28, 2014, provisional application No. 61/936,634, filed on Feb. 6, 2014, provisional application No. 61/932,905, filed on Jan. 29, 2014.

(51) Int. Cl.
*G06K 9/00* (2006.01)
*G06T 7/20* (2006.01)

(52) U.S. Cl.
CPC ............... *G06T 7/20* (2013.01); *G06K 9/0014* (2013.01); *G06T 7/2006* (2013.01); *G06T 2207/10016* (2013.01); *G06T 2207/30024* (2013.01); *G06T 2207/30048* (2013.01)

(58) Field of Classification Search
None
See application file for complete search history.

(56) References Cited

U.S. PATENT DOCUMENTS

| 5,241,364 | A | 8/1993 | Kimura |
| 2006/0001865 | A1 | 1/2006 | Bellalou et al. |
| 2009/0012732 | A1 | 1/2009 | Corson et al. |
| 2011/0123133 | A1 | 5/2011 | Mohanty et al. |
| 2011/0300569 | A1 | 12/2011 | Li et al. |
| 2012/0215269 | A1* | 8/2012 | Tandri ............... A61N 1/06 607/4 |
| 2013/0034272 | A1 | 2/2013 | Thomas |
| 2013/0208955 | A1 | 8/2013 | Zhao et al. |
| 2013/0224756 | A1* | 8/2013 | Cohen ............... C07K 14/195 435/6.17 |
| 2013/0287728 | A1* | 10/2013 | Pecora ............... A61K 35/28 424/85.1 |
| 2013/0294675 | A1 | 11/2013 | Liu et al. |

* cited by examiner

*Primary Examiner* — Weiwen Yang
(74) *Attorney, Agent, or Firm* — Jeffrey Schox; Ivan Wong

(57) ABSTRACT

A method and system for characterizing cell motion comprising: receiving image data corresponding to a set of images of a cell culture captured at a set of time points; segmenting, from at least one image of the set of images, a cell subpopulation from the cell culture; determining a resting signal for the cell subpopulation; determining a single-peak motion signal based upon the set of images, the set of time points, and the resting signal; detrending the single-peak motion signal of the cell subpopulation based upon the resting signal; determining values of a set of motion features of the cell subpopulation, thereby characterizing cell motion; and clustering the cell subpopulation with at least one other cell subpopulation based upon at least one of the single-peak motion signal and a value of the set of motion features.

19 Claims, 12 Drawing Sheets

METHOD AND SYSTEM FOR CHARACTERIZING CELL MOTION

CROSS-REFERENCE TO RELATED APPLICATIONS

This application claims the benefit of U.S. Provisional Application Ser. No. 61/948,449 filed 5 Mar. 2014, U.S. Provisional Application Ser. No. 61/946,087 filed 28 Feb. 2014, U.S. Provisional Application Ser. No. 61/936,634 filed 6 Feb. 2014, and U.S. Provisional Application Ser. No. 61/932,905 filed 29 Jan. 2014 which are all incorporated in their entirety herein by this reference.

TECHNICAL FIELD

This invention relates generally to the sample imaging field, and more specifically to a new and useful method and system for characterizing cell motion.

BACKGROUND

Efficient and low-cost characterization of cell lines is of great interest due to applications in pharmaceutical, clinical, and research settings. With regard to pharmaceutical applications, characterization of cellular responses to a new drug in preclinical testing, at individual and population levels, can provide insight into the effectiveness of the new drug or detrimental effects of the new drug. In clinical and research settings, characterization of cellular responses from patients and donors can provide insight into the effects of applied experimental conditions. In recent years, there has been significant progress in using induced pluripotent stem cells (iPSCs) and other cell types for modeling of human disease; however, characterization in an efficient and low-cost manner has not been successfully achieved. In particular, progress in testing and characterization of patient-specific cardiomyocytes (e.g., iPSC-derived cardiomyocytes) has been limited by several factors. In order to successfully capture dynamics of cardiomyocyte beating, several challenges need to be addressed. Appropriate methods and systems should be capable of handling variations in culture density, cultures of varying health state, and experimentally manipulated cultures. Furthermore, characterization is often challenging due to sensitivity of cultures to plating density, irregularities in motion (e.g., beating) patterns, and impurities in culture. Due to these and many other factors, proper characterization of cardiomyocytes, including characterization of cell motion in an efficient, low-cost, and accurate manner has been severely hindered.

Thus, there is a need in the sample imaging field to create a new and useful method and system for characterizing cell motion. This invention provides such a useful method and system.

BRIEF DESCRIPTION OF THE FIGS.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Method

Figure 1A:
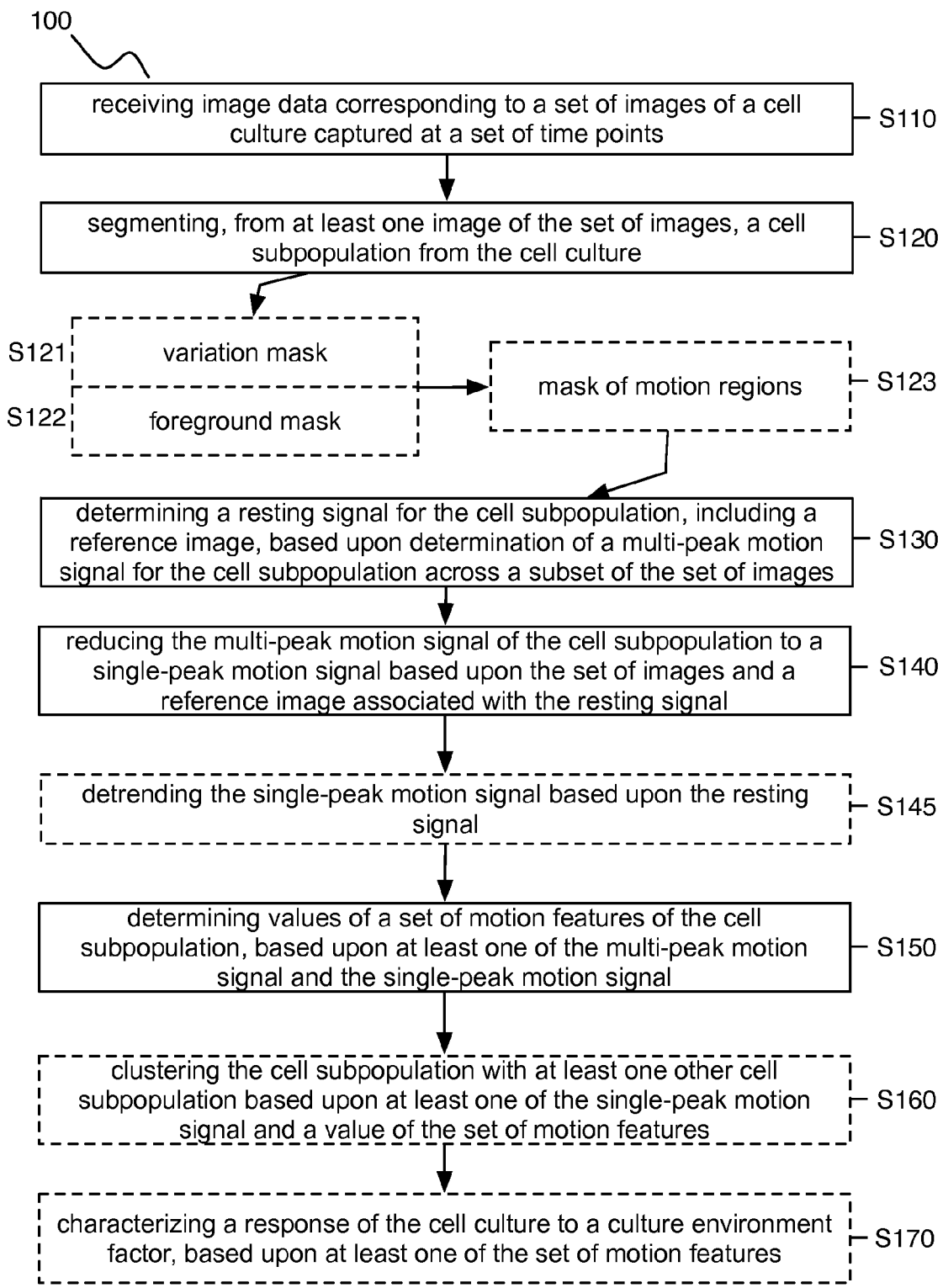
FIGS. 1A-1B depict embodiments of a method for characterizing cell motion.
Figure 1B:
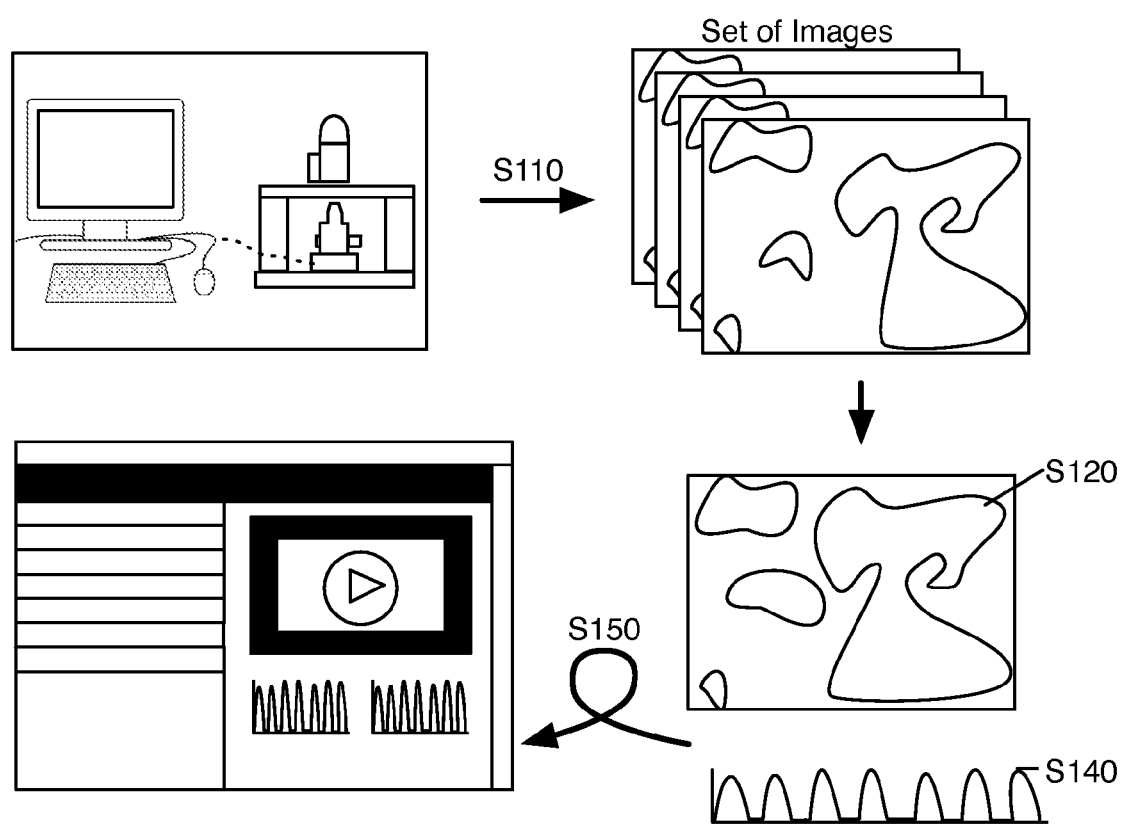
Figure 2:
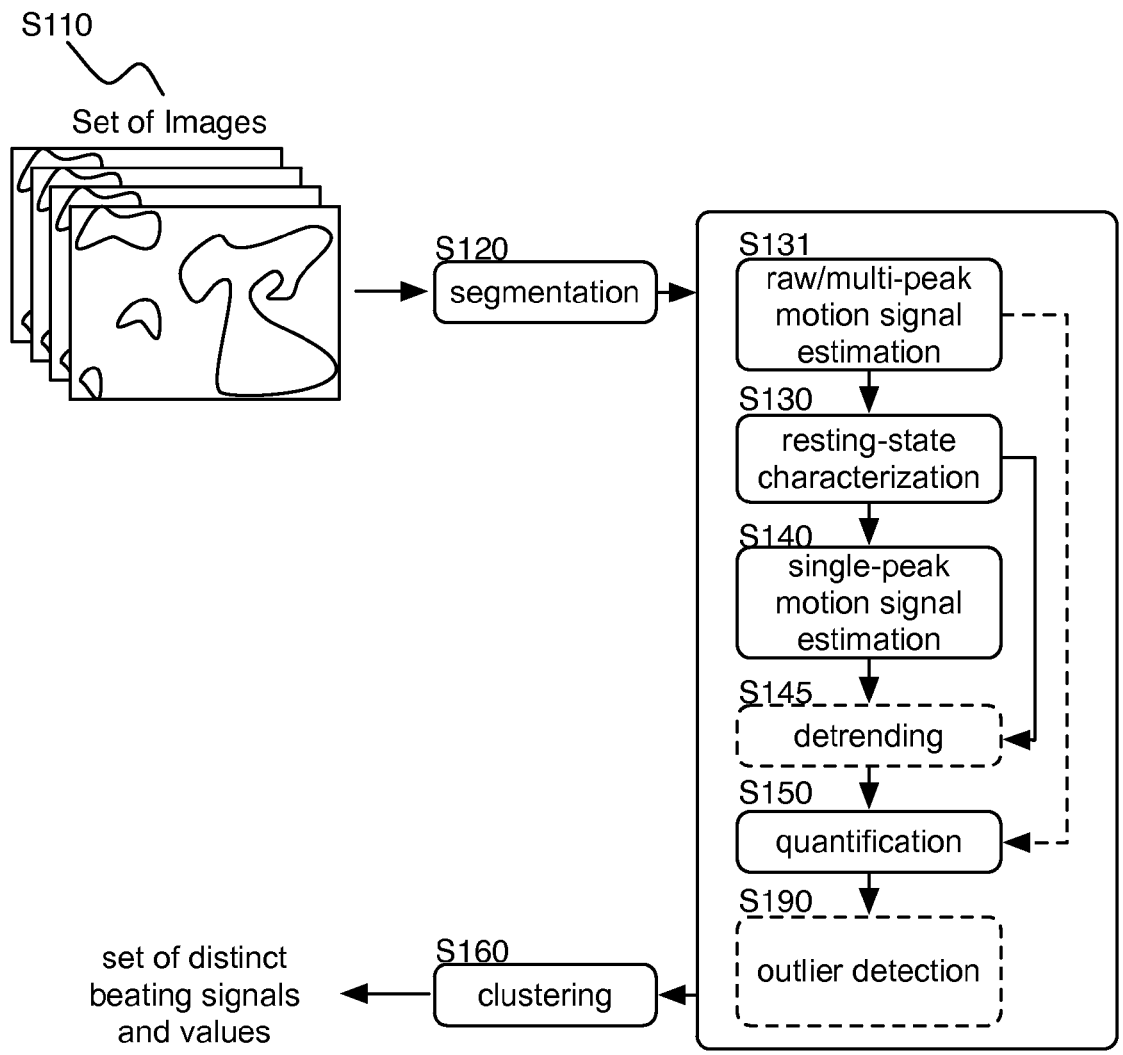
FIG. 2 depicts a variation of a method for characterizing cell motion.

As shown in FIGS. 1A, 1B, and 2 an embodiment of a method 100 for characterizing cell motion includes: receiving image data corresponding to a set of images of a cell culture captured at a set of time points S110; segmenting, from at least one image of the set of images, a cell subpopulation from the cell culture S120, determining a resting signal for the cell subpopulation, based upon determination of a multi-peak motion signal for the cell subpopulation, across a subset of the set of images S130, determining a single-peak motion signal for the cell subpopulation based upon the set of images and a reference image associated with the resting signal S140, detrending the single-peak motion signal based upon the resting signal S145; and determining values of a set of motion features of the cell subpopulation, based upon at least one of the multi-peak motion signal and the single-peak motion signal S150. In some variations, the method 100 can further include any one or more of: clustering the cell subpopulation with at least one other cell subpopulation based upon at least one of the single-peak motion signal and a value of the set of motion features S160; and characterizing a response of the cell culture to a culture environment factor, based upon at least one of the set of motion features S170.

The method 100 functions to characterize parameters of cell populations in culture, and to enable phenotypic expressions of a portion and/or an entirety of a cell culture to be assessed over time. The method 100 preferably enables multiple cell subpopulations within each of a set of cell cultures to be assessed; however, the method 100 can additionally or alternatively facilitate characterization of any suitable portion of any number of cell cultures. The method 100 can allow responses of cell cultures to experimentally applied conditions (e.g., exposure to doses of therapeutic substances) to be assessed at a subpopulation level. Furthermore, the method 100 preferably enables cell characterization without direct measurement of electrophysiological potentials, but can additionally or alternatively include validation of characterization using a micro-electrode array (MEA) system, a patch clamp system, and/or any other suitable system. In a specific application, the method 100 can characterize beating motion of cultures of cardiomyocytes (e.g., patient-sourced iPSC-derived cardiomyocytes) at a subpopulation level, wherein parameters related to cardiovascular disease (e.g., arrhythmia) are highly relevant. In variations of the specific application, the cardiomyocytes can be patient sourced or sourced from any other suitable donor, and/or can be cultured with any suitable factor configured to induce a cellular response. However, the method 100 can additionally or alternatively be adapted for characterization of motion in a tissue sample. The method 100 is preferably performed at least in part at an embodiment of the system 200 described in Section 2 below, which can enable cell cultures to be monitored remotely and characterized automatically; however, the method 100 can be performed at any other suitable system or number of systems.

Block S110 recites: receiving image data corresponding to a set of images of a cell culture captured at a set of time points, which functions to receive data that can be processed to extract a set of cell motion features characterizing the cell culture. The image data is preferably received continuously and in real time; however, the image data can be received non-continuously and/or in non-real time. The set of images preferably includes consistent images capturing the same view (e.g., view window, location, focal plane, etc.) of a culture substrate including the cell culture, as generated using a system wherein relative positions between the culture substrate(s) and the optical sensor(s) capturing image data of the cell culture(s) are constant; however, in some variations, the image data can include images that are inconsistent in view, but processable to provide consistency in view (e.g., in view window, in location, in focal plane, etc.) across the set of images. The set of time points is preferably uniformly spaced, as defined by a constant capture frame rate, but can alternatively be non-uniformly spaced, as defined by a variable capture frame rate. Furthermore, the set of time points preferably spans a duration of time capturing a motion event for at least one cell subpopulation of the cell culture, and image capture can be repeated any suitable number of times, with any suitable elapsed duration of time between imaging repetitions. In some variations, image capture can even be automatically triggered upon detection of motion within a cell culture, thereby enabling image capture in synchronization with motion of at least a portion of the cell culture. Thus, the image data is captured with an appropriate resolution, magnification, and frame rate in order to enable extraction of motion features of cells of the cell culture. However, the image data can alternatively be captured in any other suitable manner. In variations of the method 100 including capture of image data from multiple cell cultures, image capture parameters (e.g., frame rate, view, number of images) can be consistent or variable across the multiple cell cultures. Furthermore, the image data can be tagged with any suitable information, such as an experiment name, type of culture substrate (e.g., well plate type, culture dish type), number of samples per culture substrate, location of cell culture(s) within a substrate, capture frame rate, capture duration, number of imaging repetitions, and time elapsed between subsequent imaging repetitions.

In a specific example for capture and characterization of cardiomyocyte cultures, each group of cardiomyocytes is defined as one of four samples in a 12-well plate, wherein each sample is imaged with a magnification of 10× at a frame rate of 24 frames/second for 30 seconds, with up to 3 imaging repetitions over the duration of cell analysis, in order to capture beating behavior of the cardiomyocyte cultures. In the specific example, each culture is also illuminated with red light (e.g., 625 nm wavelength), and imaged using a CMOS optical sensor, as described in Section 2 below. In variations of the specific example, however, the image data for each sample can be captured at any other suitable frame rate (e.g., 15-100 frames/second), for any other suitable duration (e.g., 10-120 seconds), with any suitable number of repetitions of image capture, with any suitable time elapsed (e.g., one hour, two hours, etc.) between subsequent imaging repetitions, with any other suitable illumination (e.g., illumination to detect fluorescence), and using any other suitable optical sensor. Furthermore, each cell culture can be defined at any other suitable substrate (e.g., 6-well plate, 12-well plate, 24-well plate, 48-well plate, 96-well plate, 384-well plate, culture dish, etc.), with any other suitable plating density, during image capture.

In variations of Block S110, non-image data can additionally be received for further processing to extract the set of cell motion features. For instance, in some variations, data characterizing electrophysiological potentials of the cell culture (s) can be received in Block S110, for instance, using a micro-electrode array (MEA) system. In another variation, data characterizing impedance signals within at least a portion of a cell culture can be received in Block S110, for instance, using an impedance-based system including an electrode array. In still another variation, force sensors integrated into a culture substrate can be used to generate data that can be processed to extract motion features of the cell culture (s). In still another variation, electrodes can be integrated into the culture area to provide electrical stimulation. However, any other suitable system or type of data can be received in Block S110.

Block S120 recites: segmenting, from at least one image of the set of images, a cell subpopulation from the cell culture, which functions to identify portions of the cell culture exhibiting motion from background and/or portions of the cell culture not exhibiting motion. Segmenting preferably identifies regions of an image that comprise cells expected to exhibit motion, and/or identifies regions of an image that comprise cells, particles, or background not exhibiting motion. As such, Block S120 produces a set of segmented images, each image preferably identifying at least one region representing cells of a cell subpopulation that are in proximity of each other and exhibit similar motion behavior. Even further, Block S120 can identify multiple cell subpopulations within the cell culture, wherein each cell subpopulation exhibits or lacks motion behavior. However, in some variations, Block S120 may produce at least one image without a segmented region. In variations, Block S120 can segment an image into regions that comprise cells expected to exhibit cyclic motion (e.g., beating), and regions that comprise cells and background that do not exhibit cyclic motion. However, Block S120 can additionally or alternatively identify a set of motion regions and/or a set of static regions, according to any other suitable type of motion (e.g., non-cyclic motion) for one or more images of the set of images.

In variations of Block S120 for cell cultures including moving cells that are indistinguishable from unmoving cells, aside from exhibition of motion behavior, segmentation can be performed according to variations in image intensity over time. For instance, in cardiomyocyte cultures, cell boundaries are typically unclear and beating and non-beating cells are similar in morphology and appearance (e.g., intensity) within a single image frame; thus, delineating individual cells/subpopulations and classifying them according to beating or non-beating behavior based upon traditional intensity or texture-based segmentation algorithms often proves difficult. In characterizing such cultures, however, variations in image intensity across a sequence of images, as determined from a statistical measure of variation, can be used as a basis for segmentation to identify the cell subpopulation(s) exhibiting or lacking motion behavior. For instance, regions of a cell culture exhibiting a statistical measure of temporal variation in intensity above a certain threshold, as determined from the set of images, can be classified as motion regions, and regions of a cell culture exhibiting a statistical measure of temporal variation in intensity below a certain threshold, as determined from the set of images, can be classified as non-motion regions. However, any other suitable parameter determined across the set of images can be used to perform segmentation of the cell culture(s) into motion regions and/or non-motion regions.

Figure 3A:
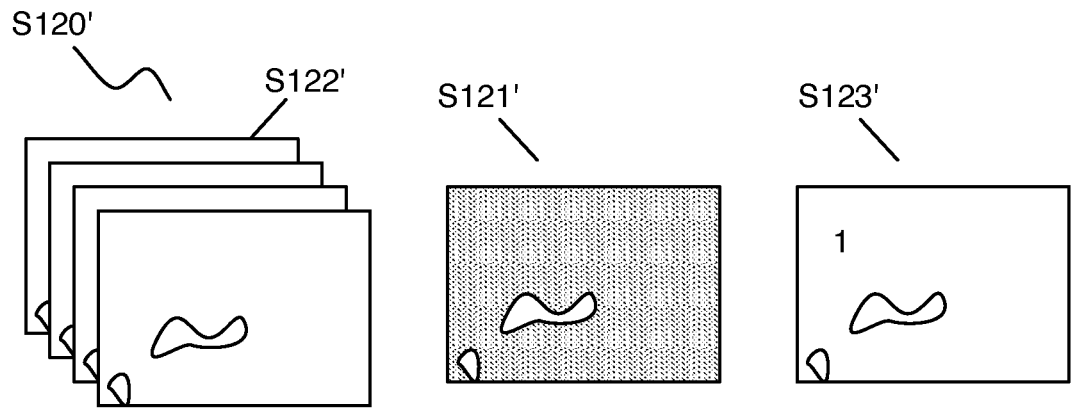
FIGS. 3A-3B depict variations of a portion of a method for characterizing cell motion.
Figure 3B:
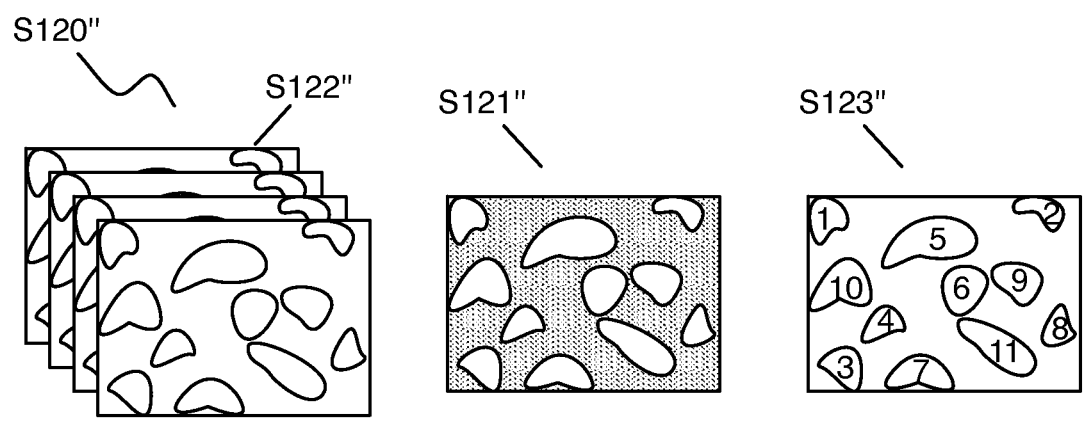

In one such variation, as shown in FIGS. 1A, 3A, and 3B, Block S120 can include constructing a variation mask S121, constructing a foreground mask S122, and constructing a mask of motion regions based upon an intersection between the foreground mask and the variation mask S123. In Block S121, the variation mask is preferably constructed over the entire set of images, and preferably defines a standard deviation of image intensities for each location of a set of locations of the cell culture and captured within the set of images at the set of time points. The set of locations can be defined for the cell culture(s) using Cartesian coordinates, cylindrical coordinates, spherical coordinates, or any other suitable coordinate definition. In one example, the set of locations can be locations (e.g., points, areas) in a rectangular grid spanning a two dimensional plane including cells of the cell culture, wherein the resolution of the locations (e.g., distance between points, dimension of areas, etc.) is governed according to a governing dimension of cells of the cell culture. Additionally, the variation mask can be manipulated using thresholding (e.g., regions of the variation mask exhibiting standard deviations in intensity above a threshold can be classified as motion regions, regions of the variation mask exhibiting standard deviations in intensity below a threshold can be classified as non-motion regions, etc.), using morphological operations (e.g., to remove voids in a segmented region, to remove segmented regions smaller than a limiting size, etc.), and/or in any other suitable manner. Furthermore, in alternative variations of Block S121, the variation mask can be constructed over any subset of the set of images, can define variation in image intensity (and/or any other image parameter) using any other suitable measure of statistical variation (e.g., variance, etc.) for any suitable number of locations defined across the cell capture, and for any subset of the set of time points. In Block S122, the foreground mask is preferably defined from a single image of the set of images, and can be defined using the first image of the set of images or any other suitable image(s) of the set of images. In some variations of Block S122, the foreground mask can alternatively be defined by performing any suitable mathematical operation (e.g., averaging) upon multiple images of the set of images. In Block S123, constructing the mask of motion regions based upon an intersection between the foreground mask and the variation mask preferably produces a set of N connected regions, $R_1$, $R_2$, ... $R_N$, wherein each connected region defines a motion region, corresponding to a cell subpopulation, from which motion features can be determined. As shown in FIG. 3A, processing of a first set of images of a cell culture according to Blocks S120', S121', S122', and S123' produces an output of one motion region corresponding to a single cell subpopulation, and as shown in FIG. 3B, processing of a second set of images of a cell culture according to Blocks S120", S121", S122", and S123" produces an output of 11 motion regions corresponding to 12 cell subpopulations.

In variations of Block S120 wherein an individual image of the set of images can be used to segment regions of interest, each image in the set of images is preferably segmented according to the same segmenting algorithm; however, in some variations of Block S120, a subset or a single image of the set of images can be segmented according to a segmenting algorithm, wherein the identified motion region(s) and/or static region(s) in the image or subset of images can be mapped onto another image of the set of images. In these variations, mapping can include any one or more of identification of a region (e.g., an area of a region, a boundary of a region, etc.) in a first image based upon shape and/or edge detection; generating a comparison of similarity between areas or boundaries within the first image and the second image; tagging regions within the first image and the second image as corresponding regions based upon the comparison(s) of similarity; and any other suitable mapping step. Segmenting can, however, be performed in any other suitable manner.

In variations of Block S120, segmentation can include partitioning all or any portion of the image data to patches. Patches can be overlapping or non-overlapping and/or have fixed or variable size. In some variations, the method can use a background estimation method to exclude patches that cover only background pixels. Motion signals can then be estimated for each patch as described in Blocks S130, S140, S145, and S150. Furthermore, patches can be clustered together as described in Block S160, or processed in any other suitable manner.

Block S120 can further include classification and/or exclusion of one or more particle types (e.g. debris and dead cells), such that particles are classified (e.g., using texture features, using intensity features) and/or excluded from identified motion regions. According to the classification, the prevalence, location, and/or any other suitable feature of these particle types can be reported as an additional output of the method 100.

Furthermore, in some variations of the method 100, Block S120 can facilitate decision making in performing subsequent analyses of the cell culture(s) using the set of images. In one example, a total area of motion regions captured within a total area of view can be compared to the total area of view (e.g., by determining a ratio of the total area of motion regions to the total area of view), wherein the comparison is used to classify the set of images as an image sequence exhibiting cell motion or an image sequence lacking cell motion. Classification of the set of images as lacking cell motion can then be used as a basis to stop further analysis of the set of images, or to perform alternative analyses of the set of images. Block S120 can, however, facilitate decision making in embodiments of the method 100 in any other suitable manner.

Figure 4A:
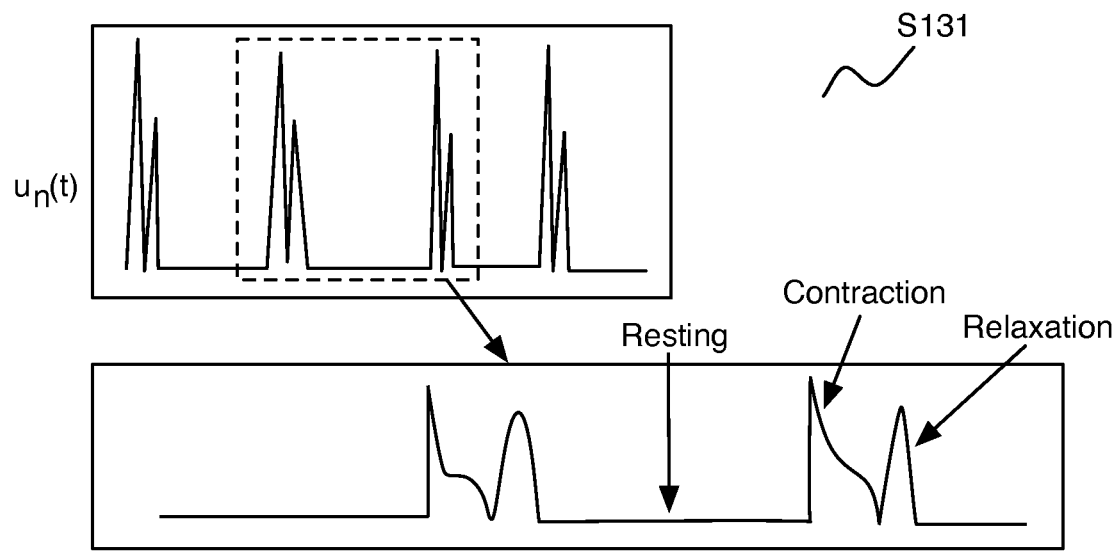
FIGS. 4A-4B depict variations of a portion of a method for characterizing cell motion.

Block S130 recites: determining a resting signal for the cell subpopulation, based upon determination of a multi-peak motion signal for the cell subpopulation, across a subset of the set of images, which functions to provide a baseline signal that can be used to determine a single-peak motion signal. Determination of the resting signal can also facilitate detrending of any motion signal due to undesired variations (e.g., drift) of a signal over time. Determining a resting signal for the cell subpopulation can include generating a multi-peak motion signal for the cell subpopulation, based upon analyzing a motion region ($R_n$, n=1, 2, ... N) across multiple images of the set of images S131, as shown in FIG. 4A, from which the resting signal can be derived. As such, in Block S130, a resting signal and reference image can be determined for each region $R_n$ identified in the set of images. In applications of the method 100 involving characterization of cell cultures including cells exhibiting cyclic behavior, the multi-peak motion signal can include peaks corresponding to grouped contraction and/or relaxation phases, separated by periods of rest from which the resting signal can be determined. In one such application involving characterization of cardiomyocyte cultures, the multi-peak motion signal for the cell subpopulation can include paired peaks corresponding to paired contraction and relaxation phases, separated by resting phases, as shown in FIG. 4A. Generating the multi-peak motion signal for the region $R_n$ is preferably performed in the time domain and omits assumptions about periodicity of the multi-peak motion signal; however, alternative variations of generating the multi-peak motion signal for the region $R_n$ can be performed in any other suitable domain (e.g., the frequency domain), and/or with assumptions about signal periodicity.

In an application for cardiomyocyte characterization, generating the multi-peak motion signal for the cell subpopulation corresponding to a motion region ($R_n$, n=1, 2, . . . N), from the set of images, includes forming an array (e.g., one dimensional vector, multi-dimensional tensor, etc.) of pixel intensities with a time-varying component, denoted by $A_n(t)$, where t is time and n=1, 2, . . . N. Starting from the second image (e.g., the image at which t=2) to the last image (e.g., the image at which t=N) in the set of images, a correlation coefficient operation is iteratively performed for the array $A_n$ of pixel intensities at the time point of an image and a time point of a preceding image (e.g., immediately preceding, not immediately preceding) in the set of images. However, any other suitable operation (e.g., optical flow operation, difference operation, registration error operation, other correlation coefficient operation, etc.) performed for any other group of images of the set of images can be performed in any other suitable manner (e.g., iteratively, recursively, etc.). As shown in FIG. 4A, the multi-peak motion signal for the region $R_n$, determined from iterative performance of the correlation coefficient operation, can be denoted as $u_n(t)=corr\_coeff(A_n(t), A_n(t-1))$, where corr_coeff is a correlation coefficient operation and $A_n(t)$ and $A_n(t-1)$ are the arrays of pixel intensities corresponding to motion region $R_n$ at frame t and t−1, respectively. In some variations of this application, the multi-peak motion signal for the region $R_n$ can be manipulated in any suitable manner, for instance, to adjust a baseline level of the multi-peak motion signal. In one such variation, the multi-peak motion signal for the region $R_n$, $u_n(t)$ can be subtracted from a maximum value (or other value) of $u_n(t)$, in order to invert and/or adjust a baseline level of the multi-peak motion signal. Any other suitable manipulation of the multi-peak motion signal can, however, be performed.

In the application for cardiomyocyte characterization, generating the resting signal for the cell subpopulation based upon determination of the multi-peak motion signal, can include generating a reference image, or a set of reference images for a region based upon identification of a subset of resting-state images characterizing periods of rest for the region $R_n$. As such, the resting signal can have an associated reference image and an associated subset of resting-state images. In one variation, a resting-state image is identified as an image from the set of images with a substantially high correlation (e.g., in pixel intensity distribution) to a preceding image (e.g., an immediately preceding image) in the set of images. Additionally or alternatively, a resting-state image can be determined based upon a comparison between values of a multi-peak motion signal $u_n(t)$ for a motion region $R_n$ and a threshold condition defined using the multi-peak motion signal. In one such example, a resting-state image can be selected from a subset of the set of images subject to a condition wherein $u_n(t)$ is within 10% of a maximum value of $u_n(t)$; however, a resting-state image can be determined according to any other suitable condition, or in any other suitable manner. Upon identification of the subset of resting-state images, the reference image can be determined based upon the subset of resting-state images (e.g., as a median of the subset of resting-state images, as any other average of the subset of resting-state images, etc.), and an array of pixel intensities for the reference image corresponding to the region $R_n$ can be defined as $B_n$. The resting signal can then be defined as portions (e.g., indices) of the beating signal $u_n(t)$ corresponding to the subset of resting-state images, wherein the resting signal has no value for durations of time between resting-states. The resting signal can, however, be determined from the subset of resting-state images in any other suitable manner.

A multi-peak motion signal can be generated for each motion region ($R_n$, n=1, 2, . . . N) corresponding to a cell subpopulation of the cell culture, thereby producing a set of multi-peak motion signals ($u_n(t)$, n=1, 2, . . . N) for a set of motion regions segmented according to Block S120. The set of multi-peak motion signals can be generated under an assumption that disconnected regions of the set of motion regions have different motion behavior (e.g., as characterized in different beating signals), but that connected regions of the set of motion regions exhibit identical motion behavior (e.g., as characterized in a single beating signal). Alternatively, each connected region of the set of motion regions can be partitioned into blocks (e.g., fixed-sized non-overlapping blocks), a motion signal can be determined for each block, and then regions exhibiting similar motion signals can be clustered to generate the set of multi-peak motion signals. Furthermore, a resting signal can also be generated for each motion region corresponding to a cell subpopulation, thereby producing a set of resting signals for the set of motion regions segmented according to Block S120. However, other variations of Block S130 can include generation of any other suitable signal (e.g., non-multi-peak signal) for any number of cell subpopulations of a cell culture, which can be processed in any other suitable manner to facilitate characterization of motion behavior for the cell culture(s).

Figure 4B:
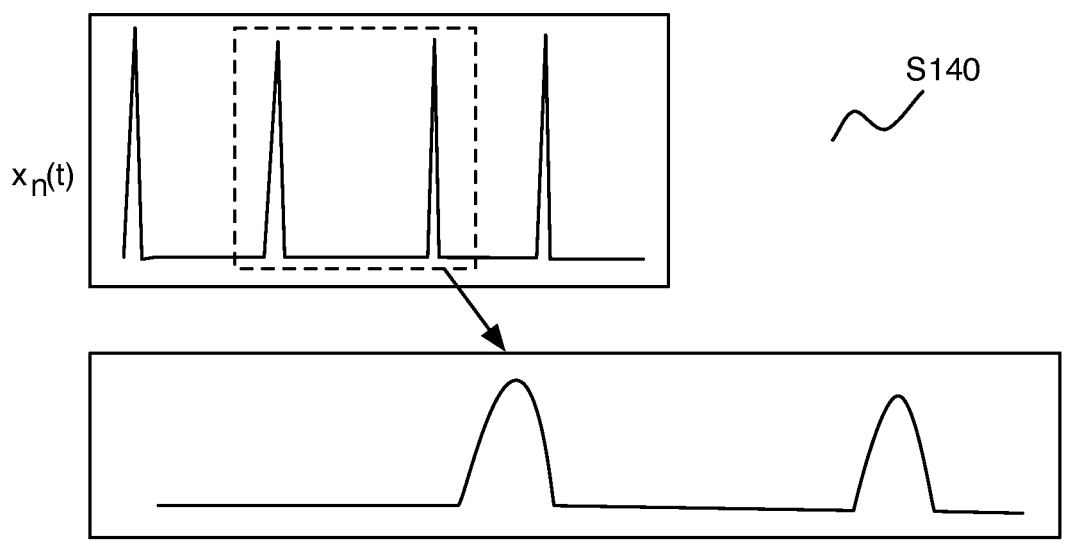

As shown in FIG. 1A and depicted in FIGS. 4A and 4B, Block S140 recites: determining a single-peak motion signal for the cell subpopulation based upon the set of images and a reference image associated with the resting signal, which functions to facilitate automatic detection of at least one motion feature of a set of motion features characterizing the cell subpopulation. Preferably generating the single-peak motion signal is performed using the reference image associated with the resting signal for a region $R_n$ corresponding to the cell subpopulation; however, generating single-peak motion signal can additionally or alternatively be performed using any other suitable parameter or image associated with the resting signal. In one variation, the single-peak motion signal can be determined by performing a correlation coefficient operation with a time-varying array of pixel intensities $A_n(t)$ for the region $R_n$, and an array of pixel intensities for the reference image $B_n$ corresponding to the region $R_n$. In this variation, the single-peak motion signal can be denoted as $x_n(t)=corr\_coeff(A_n(t), B_n)$, where corr_coeff is a correlation coefficient operation. However, any other suitable operation (e.g., optical flow operation, difference operation, registration error operation, other correlation coefficient operation, etc.) can be used to derive the single-peak motion signal. In some variations of Block S140, the single-peak motion signal for the region $R_n$ can be manipulated in any suitable manner, for instance, to adjust a baseline level of the single-peak motion signal. In one such variation, the single-peak motion signal for the region $R_n$, $x_n(t)$ can be subtracted from a maximum value (or other value) of $x_n(t)$, in order to invert and/or adjust a baseline level of the single-peak motion signal. Additionally, an amplitude of the single-peak motion signal can be modulated by the magnitude of motion, estimated from a motion vector estimation method (e.g. optical flow, registration). Any other suitable manipulation of the single-peak motion signal can, however, be performed.

In alternative variations of Block S140, the single-peak motion signal can be generated in any other suitable manner. In one such variation, one or more peaks of a group of peaks of a multi-peak motion signal can be removed from consideration. In another variation, multiple peaks of a group of peaks of a multi-peak motion signal can be averaged and given a time point based upon an average time point of the multiple peaks of the motion signal. Some variations of the method 100 can alternatively entirely omit reduction of a multi-peak motion signal to a single-peak motion signal.

Figure 5:
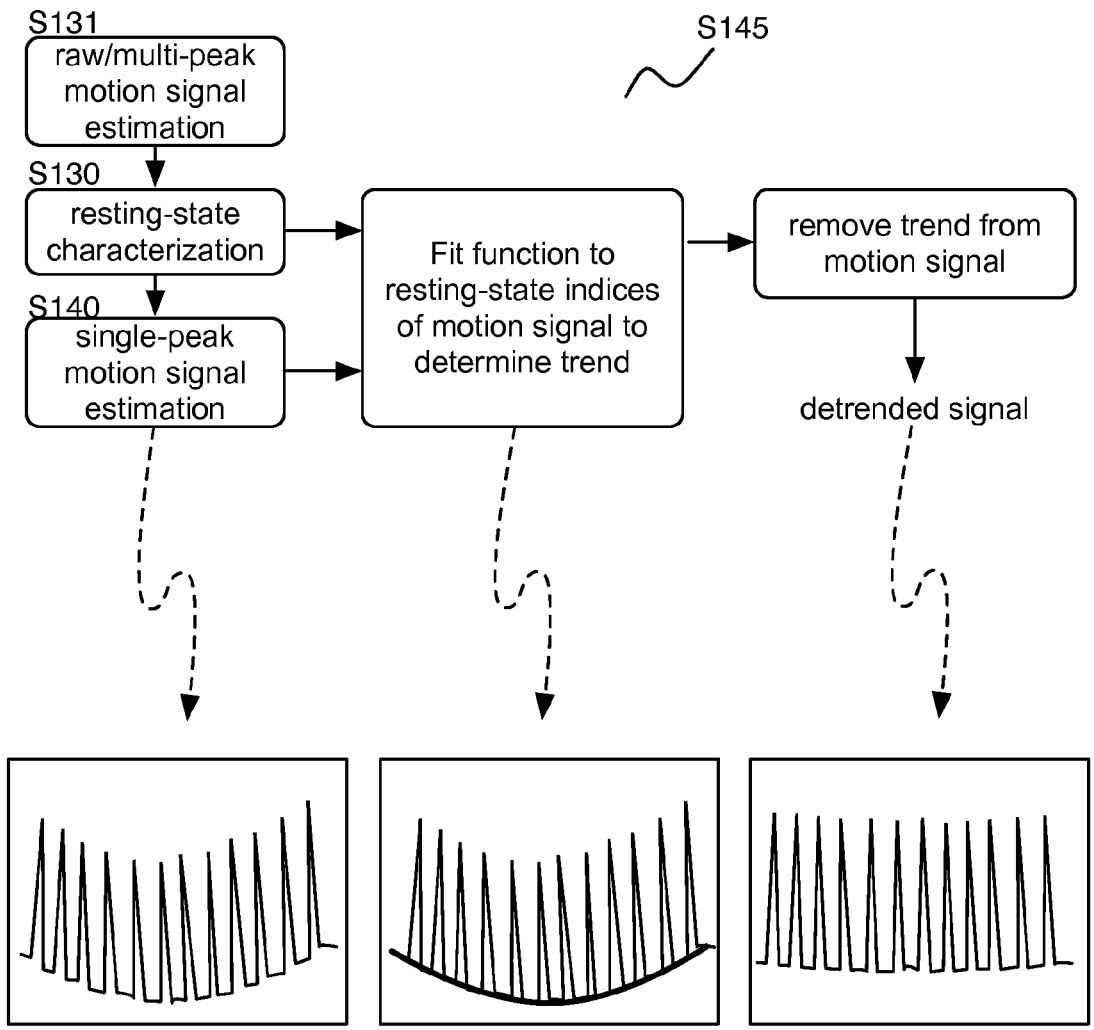
FIG. 5 depicts a variation of a portion of a method for characterizing cell motion.

In some variations, the method 100 can additionally comprise Block S145, which recites: detrending the single-peak motion signal based upon the resting signal. Block S145 functions to address or remove undesired variations in the single-peak motion signal, which can be caused by drift or any other factor, as shown in FIG. 5. In variations wherein the resting signal is defined as portions of the beating signal $u_n(t)$ corresponding to a subset of resting-state images, a fit function can be fitted to the resting signal in order to obtain a trend of the resting signal, wherein the trend can then be removed from at least one of the multi-peak motion signal and the single-peak motion signal, based upon the fit function. The fit function can be a polynomial function of any suitable order (e.g., a $2^{nd}$-order polynomial function), an exponential function, a logarithmic function, a sinusoidal function, and/or any other suitable function that can be fitted to the resting signal. Alternatively, the single-peak motion signal and/or the multi-peak motion signal can be detrended in any other suitable manner.

Block S150 recites: determining values of a set of motion features of the cell subpopulation, based upon at least one of the multi-peak motion signal $u_n(t)$ and the single-peak motion signal $x_n(t)$, which functions to characterize motion of the cell subpopulation in a quantitative manner. The set of motion features preferably include quantitative motion features, but can additionally or alternatively include qualitative motion features. In some applications for cardiomyocyte culture characterization, the set of motion features can include features related to any one or more of: beat frequency (e.g., effective beating frequency, minimum beating frequency, maximum beating frequency), regularity or irregularity of beating, duration of beating (e.g., of an individual pulse, of a series of pulses), prevalence of beating regions, signal and/or beat shape (e.g., QT characteristics, abnormalities in beating pattern, etc.), duration of a signal peak (e.g., duration of contraction, duration of relaxation), duration of a resting state, contractile strength/magnitude, and any other suitable motion feature. However, any other suitable motion feature can be characterized for the cell subpopulation in variations of Block S150.

In variations of Block S150 for determination of beat frequency characteristics, local maxima of a motion signal (i.e., $u_n(t)$, $x_n(t)$) for a region $R_n$ characterizing the cell subpopulation can be identified, for instance, by taking a derivative of the motion signal with respect to time (or any other suitable variable), and locating regions of the motion signal wherein the derivative is substantially close to zero (e.g., ≤0.001, ≤0.0001, etc.). Additionally or alternatively, local maxima can be identified according to an imposed condition, such as a condition that requires an identified maximum to be larger in magnitude than a certain percentage (e.g., 95%, 98%, etc.) of a maximum value of the motion signal. Imposition of such a condition can function to prevent consideration of local maxima caused by noise or any other suitable undesired factor. Upon identification of a set of local maxima, an array of intervals between successive local maxima, denoted as Int(t), can be constructed and converted to a frequency array, denoted as freq(t), wherein freq(t) is determined as a ratio between the frame rate used to capture the set of images and the array of intervals, Int(t). The frequency array can then be used to determine one or more of: a value of an effective beating frequency (e.g., as a median or mean of the frequency array), a value of a minimum beating frequency, a value of a maximum beating frequency, a value derived from a statistical measure of variation in the beating frequency as a measure of beating irregularity, and any other suitable frequency array-derived value. In specific examples, values of beating irregularity can be determined as the std(freq(t))/mean(freq(t)), or as the mean(abs(freq(t)−median(freq(t)))/median(freq(t)), or as the (maximum(freq(t))−minimum(freq(t)))/(2median(freq(t)), where std is an operation determining the standard deviation of an array, mean is an operation to determine the mean of an array, abs is an operation to determine an absolute value of an array, and median is an operation to determine a median of an array. Values of beating irregularity can, however, be determined in any other suitable manner. Additionally, the frequency array and/or any other motion features derived from the frequency array can, however, be determined in any other suitable manner.

In variations of Block S150 for determination of signal shape and duration characteristics, characteristic beating shapes can be identified using the multi-peak motion signal $u_n(t)$ or the single-peak motion signal $x_n(t)$ for a region $R_n$, or any other suitable motion signal for the region of interest. In an example, a beating duration can be determined based upon parameterizing a motion signal (i.e., $u_n(t)$, $x_n(t)$) with a parametric model. A parametric model can take the form of $\Sigma_i w_i f(\theta_i)$, i=1:M, where M is the number of beats in the motion signal, $w_i$'s are the weights and $\theta_i$'s are the parameters of the model. Weights and all or a subset of parameters, $\theta_i$'s, can be assumed to be the same for all the beats in the motion signal. An example of f( ) is the Gaussian distribution, $N(\mu_i, \sigma_i^2)$, wherein $\mu_i$'s (i.e., means) correspond with locations of local maxima, and $\sigma_i^2$ (i.e., variances) are estimated by minimizing a difference between the Gaussian mixture signal and a motion signal (i.e., $x_n(t)$, $u_n(t)$). A duration of each beat can then be determined as a function of $\sigma_i$ (e.g., $6\sigma_i$). Alternatively, however, any other suitable model (e.g., skew student-t mixture model, skew normal mixture model, Gamma mixture model) with any suitable shape parameters can be used to parameterize the motion signals. Additionally or alternatively, parametric model fitting can be performed analytically or through iterative optimization techniques (e.g., gradient descent), with or without imposed constraints on model parameter ranges.

In one variation of Block S150 for determination of signal shape and duration characteristics, the shape modelling can be performed in two steps using the single-peak signal, and with the assumption that all beats of the motion signal have similar shape and amplitude. As an example, in the first step, the motion signal can be parameterized with $\Sigma_i w N(\mu_i, \sigma^2)$, wherein $\mu_i$'s (i.e., means) correspond with locations of local maxima with an offset variable d. The offset variable d, w (i.e., weight), and $\sigma^2$ (i.e., variance) are estimated by minimizing a difference between the parametric model and a motion signal, i.e. $x_n(t)$. This can provide a rough but robust modeling of the signal. In the second step, a more accurate model fitting of the beat shape is performed by using the estimated parameters of the first model for initial values and limiting the search space. In the second step, the motion signal is parameterized with a mixture of two Gaussians as $\Sigma_i[w_1 N(\mu_i, \sigma_1) + w_2 N(\mu_i + o, \sigma_2)]$, where $\mu_i$'s (i.e., means) correspond with locations of local maxima, $w_1$ and $w_2$ are the weights of the first and second Gaussians, $\sigma_1$ and $\sigma_2$ are the standard deviations of the first and second Gaussians, and o is the offset or distance of the mean of second Gaussian relative to the first Gaussian. These 5 parameters ($w_1$, $w_2$, $\sigma_1$, $\sigma_2$, and o) are estimated in a constrained space defined by a function of parameters estimated in the first step and by minimizing a difference between the parameterized model and the motion signal.

Figure 4C:
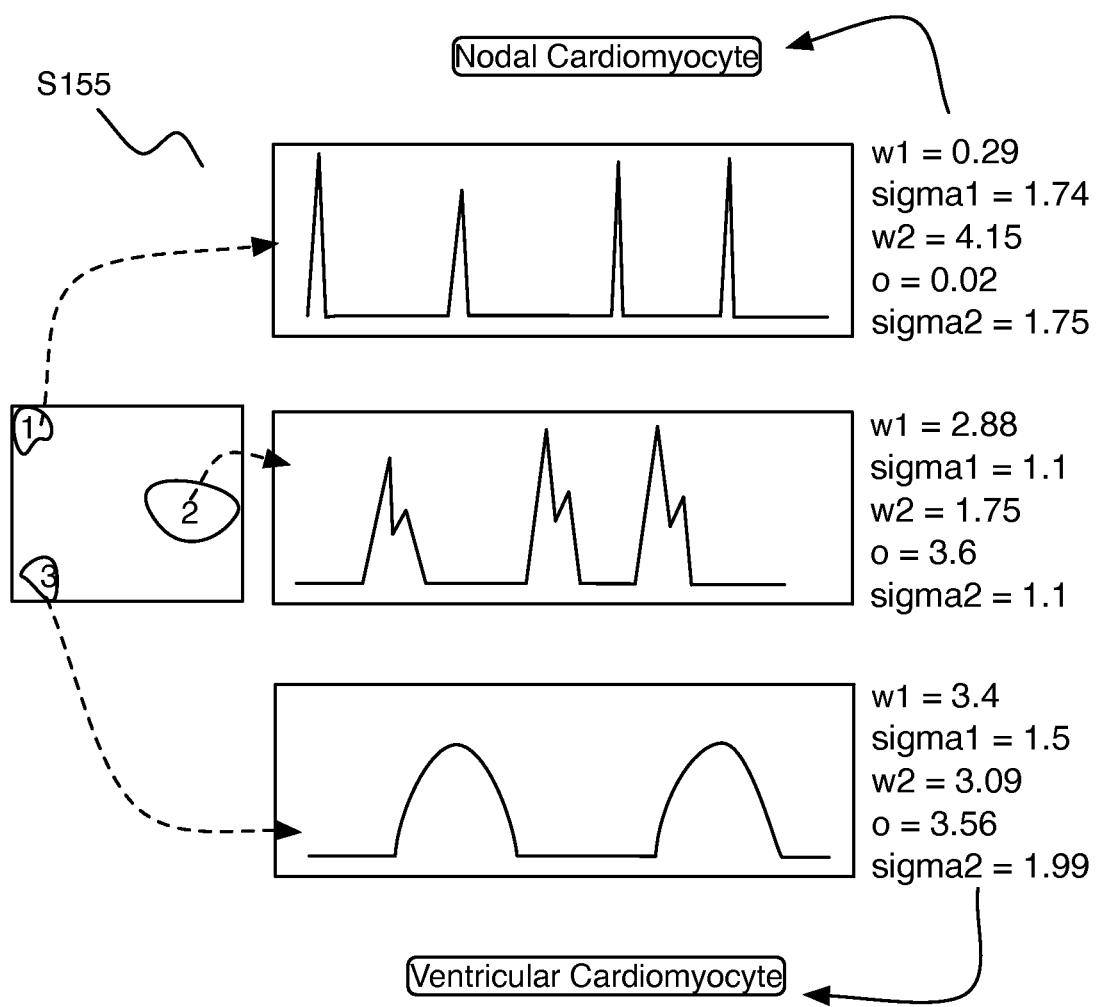
FIG. 4C depicts a variation of a portion of a method for characterizing cell motion.

As shown in FIG. 4C, the shape parameters estimated at Block S150 can be used for classification of cardiomyocytes to their sub-types (e.g. nodal, atrial, or ventricular), S155, enabling large-scale population-level characterization of a cardiomyocyte cell culture. The classification step can be done by imposing a range for each of the shape parameters, learned experimentally or through training a machine-learning classifier. As an example, such classification can be performed through training a classifier based on one or more of the beat shape parameters (e.g., $w_1$, $w_2$, $s_1$, $s_2$, and o) estimated through fitting a mixture of Gaussians. In some variations, the type of cardiomyocyte beating region (e.g. nodal, atrial, or ventricular) can be determined by other metrics that capture the shape of the beating profile as well as the beating frequency.

Figure 6A:
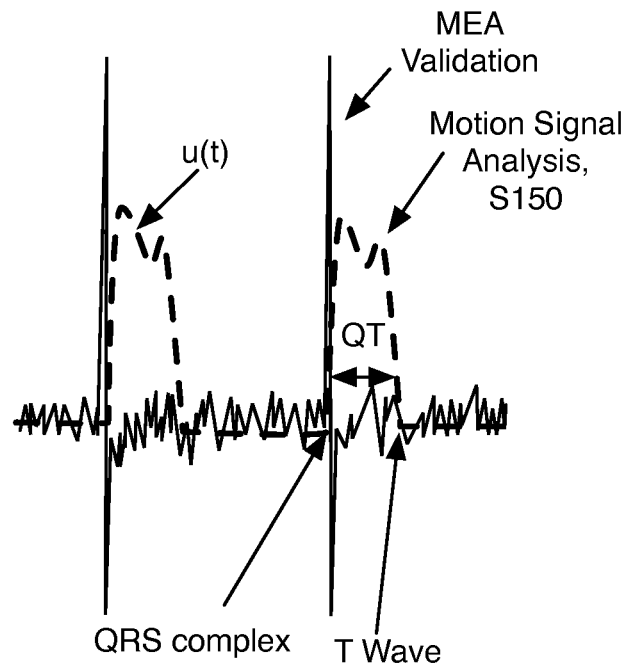
FIGS. 6A-6B depict variations of a portion of a method for characterizing cell motion.
Figure 6B:
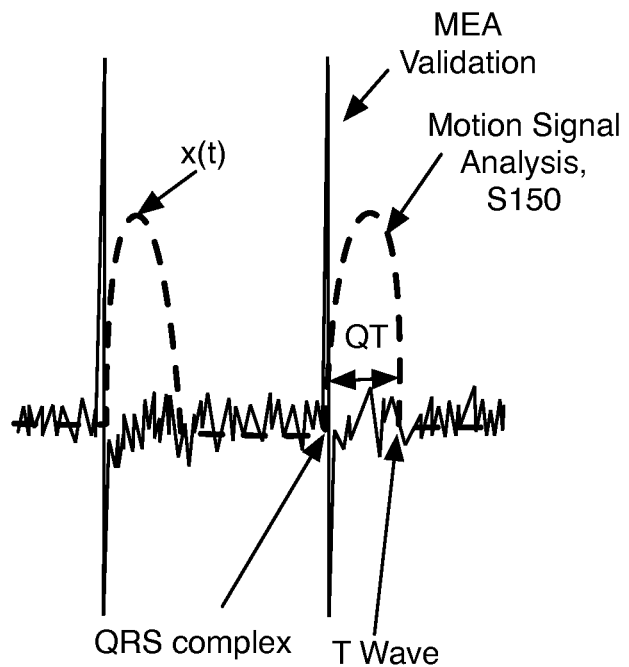

In some variations, determination of signal shape and duration characteristics can be used to generate values of QT characteristics, as shown in FIGS. 6A and 6B. For instance, upon determination of a beating duration, an initiation of a beat can correspond to the QRS complex (e.g., the initiation of the QRS complex), and a termination of a beat can correspond to a T wave feature (e.g., a termination of a T wave). Thus, a QT interval, which is defined as a measure of time between the start of a QRS complex and the end of a T wave in a cardiac cycle, can be estimated based upon the beating duration of single-peak signal (e.g., duration of a single-peaks signal) or sum of contraction and relaxation duration in the multi-peak signal. Any other suitable motion feature can, however, be detected in variations of Block S150. For instance, in variations of Block S150 for characterization of beating prevalence, a beating prevalence value can be determined as a ratio between an area of a region $R_n$ corresponding to a motion signal and the total area of an image.

Additionally or alternatively, other motion analysis processes can be used to determine values of the set of motion features in Block S150. In an example, optical flow techniques can produce a vector field of motion within an image of the set of images, wherein vector (e.g., 2D vectors) at locations within the image depict magnitude and direction of motion with respect to a reference image. Such vector fields of motion can be used to estimate motion signals, magnitude of motion parameters (e.g., beating strength), beating contraction, and values of any other suitable motion feature. Additionally or alternatively, different types of cells (e.g., cardiomyocytes, non-cardiomyocytes) within an image capturing a cell culture can be identified using machine learning techniques (e.g., support vector machines, ensemble learning, logistic regression, Bayesian learning, etc.), wherein the machine learning techniques can be trained according to a set of training data defining representative features (e.g., intensity-based features, texture-based features, etc.) for the different cell types.

In some variations, as shown in FIG. 2, the method 100 can include detection and/or removal of an outlier from a motion signal S190, which functions to improve reliability of an analysis derived from the motion signal. In variations, outliers can be due to any one or more of: presence of floating debris in a culture, dirty culture substrates, induced vibrations (e.g., from adjacent equipment), and any other suitable undesired factor. Detection and/or removal of outliers can be performed in the time and/or the frequency domain, during processing of a set of images (e.g., to remove image frames including defects), during generation of a motion signal, post-generation of a motion signal, and/or at any other suitable phase of the method 100. Furthermore, outlier detection and removal can be facilitated using machine learning techniques (e.g., support vector machines, etc.), wherein a classifier can be trained to identify valid and/or invalid signals. Additionally or alternatively, the method 100 can include validation of any result of the method 100, for instance, using measurements from any other suitable system (e.g., a microelectrode array system, a patch clamp system, a fluorescence imaging system, etc.).

As an example of outlier detection method, a portion of motion signal (e.g. the first 10 seconds) can be used to classify the signal to noise or a valid beating motion. The signal is first scaled to a pre-determined range (e.g. [0:1]). The fitting error of shape modelling as described in Block S150 is considered as a basis to classify the signal. A high fitting error is associated with a high probability of the signal to be an outlier.

Figure 7A:
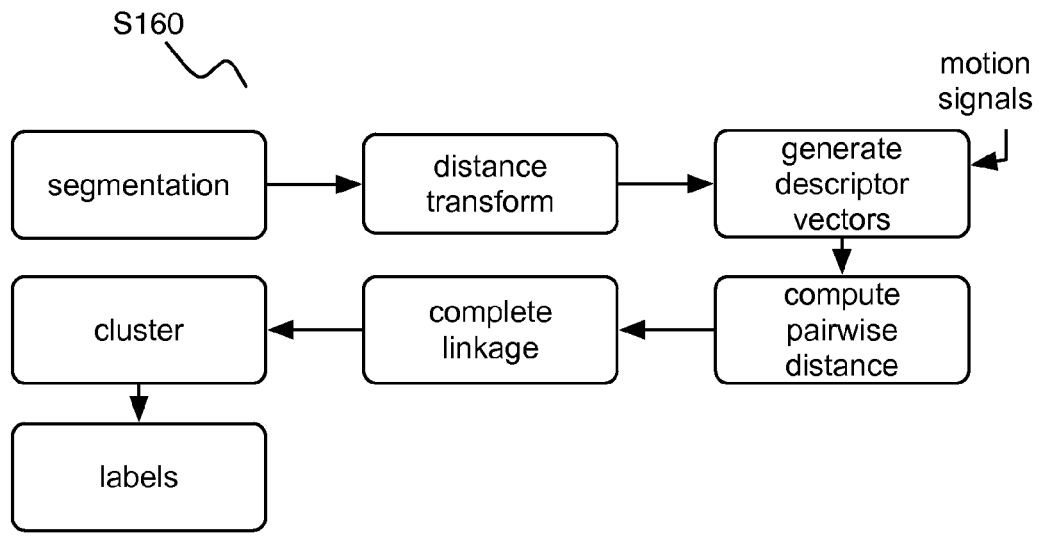
FIGS. 7A-7B depict variations of clustering in a method for characterizing cell motion.
Figure 7B:
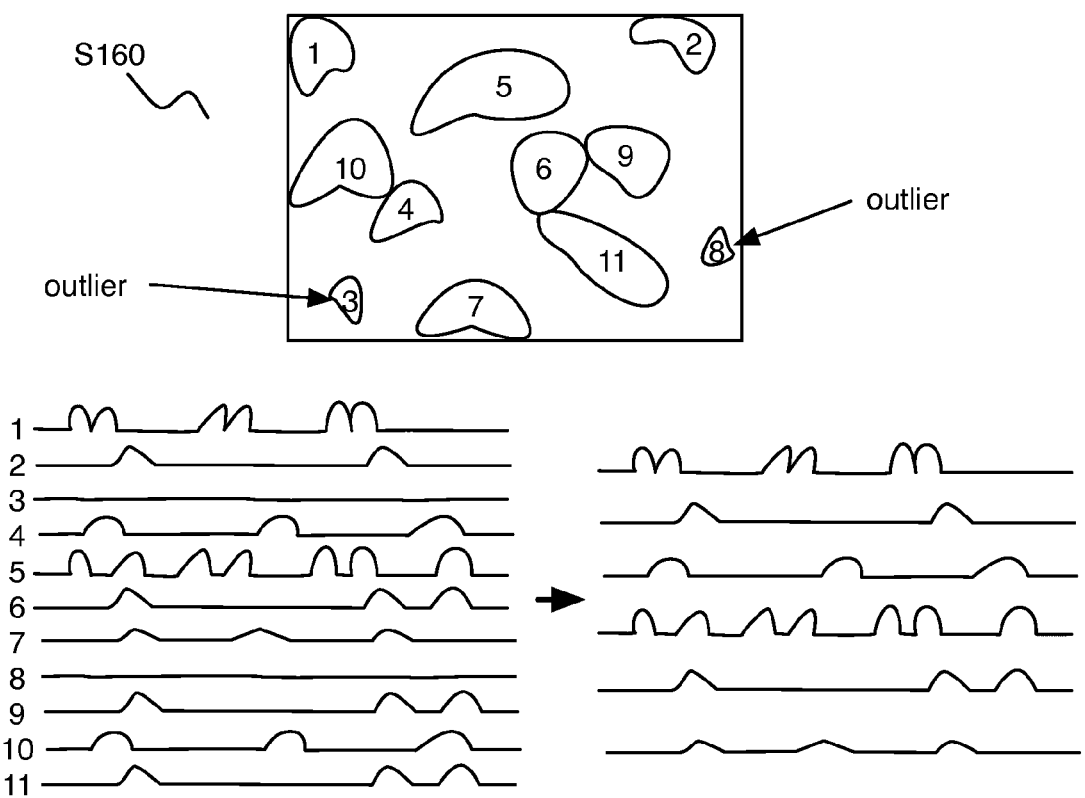

In some variations, as shown in FIG. 1A and depicted in FIGS. 7A and 7B, the method 100 can further include Block S160, which recites: clustering the cell subpopulation with at least one other cell subpopulation of the cell culture based upon at least one of the multi-peak motion signal, the single-peak motion signal, and a value of the set of motion features. Block S160 functions to consolidate identified cell subpopulations in a cell culture, based upon motion signals determined from each cell subpopulation identified in the set of images. As such, Block S160 can extract a distinct set of motion signals for the set of images, in cases wherein multiple regions $R_n$ exhibit motion behavior. Block S160 preferably incorporates a process that does not rely upon knowledge of a total number of clusters; however, Block S160 can additionally or alternatively incorporate processes (e.g., K-means clustering) that require a total number of clusters to be known.

In one variation of clustering, each motion signal (e.g., $u_n(t)$, $x_n(t)$) of a set of motion signals determined for the set of motion regions $R_n$ can be represented with a descriptor vector (e.g., a fixed-length descriptor vector). The descriptor vector can include a summary of characteristics for a corresponding motion signal, such as a mean of a motion signal, a standard deviation of a motion signal, a frequency parameter (e.g., effective frequency) of a motion signal, a location of a peak of a motion signal, a distribution of peaks of a motion signal, and/or any other suitable characteristic of the corresponding motion signal. Similar descriptor vectors can then be grouped, producing an output of a subset of motion signals, having distinct descriptor vectors, thus clustering at least one cell subpopulation with another cell subpopulation. In one example of Block S160, as shown in FIGS. 2 and 7A, a hierarchical clustering process can be implemented that incorporates spatial information by calculating a pairwise distance between motion regions $R_n$ of a set of motion regions. Regions corresponding to cell subpopulations with spatial distances within a threshold distance condition are identified as potential candidates for clustering. Then, descriptor vectors for the potential candidates are compared, and processed with an agglomerative hierarchical clustering routine to cluster the cell subpopulation(s). Clustering can, however, be performed according to one or more of: a centroid-based operation, a density-based operation, a connectivity-based operation, a distribution-based operation, and any other suitable operation. For some sets of images, however, clustering as in Block S160 may not be necessary and/or can be omitted from the method 100.

Also shown in FIG. 1A, the method 100 can further include Block S170, which recites: characterizing a response of the cell culture to a culture environment factor, based upon at least one of the set of motion features. Block S170 functions to determine effects of factors provided during culture of the cell subpopulation(s), as captured in time-varying responses of the cell subpopulation(s). The culture environment factor can include any one or more of: a chemical factor (e.g., a therapeutic substance dosage, a growth factor concentration, a neurotransmitter concentration, etc.), a mechanical factor (e.g., variations in substrate, loading under static pressure, loading under cyclic pressure, etc.), an electrical stimulation factor, an oxygen content factor (e.g., hypoxic conditions, etc.), an environmental temperature factor, a cell density factor, and any other suitable environment factor. As such, in variations of Block S170, characterization of a response preferably includes: determining a first value of a motion feature for at least a cell subpopulation of a cell culture determined using variations of one or more of Blocks S110, S120, S130, S140, S150, and S160; providing an environmental factor or a change in environment of the cell culture(s); determining a second value of the motion feature for at least the cell subpopulation of the cell culture determined using variations of one or more of Blocks S110, S120, S130, S140, S150, and S160; and generating an analysis based upon the first value and the second value, thereby characterizing a response of the cell culture(s). Alternatively different cells, cell subpopulations, and/or cell cultures can be exposed to different environmental factors, and values of motion features corresponding to each environmental factor can be determined as in variations of Block S110, S120, S130, S140, S150, and/or S160. In Block S170, the response can be characterized based upon generation of motion feature values from a single cell subpopulation and/or from multiple cell subpopulations of a cell culture, and can additionally or alternatively be performed for multiple cell cultures. Upon determination of values of one or more motion features, an analysis can be performed using any suitable statistical method with or without data transformation (e.g., a Box-Cox transformation, etc.) including one or more of: an analysis of variance (ANOVA), a correlational analysis, a comparative analysis, and any other suitable analysis. The analysis of motion features with and without environmental factor treatment can be performed automatically and/or manually. Thus, motion feature values for different culture conditions can be processed to characterize a response of the cell culture to an environmental factor.

Figure 8:
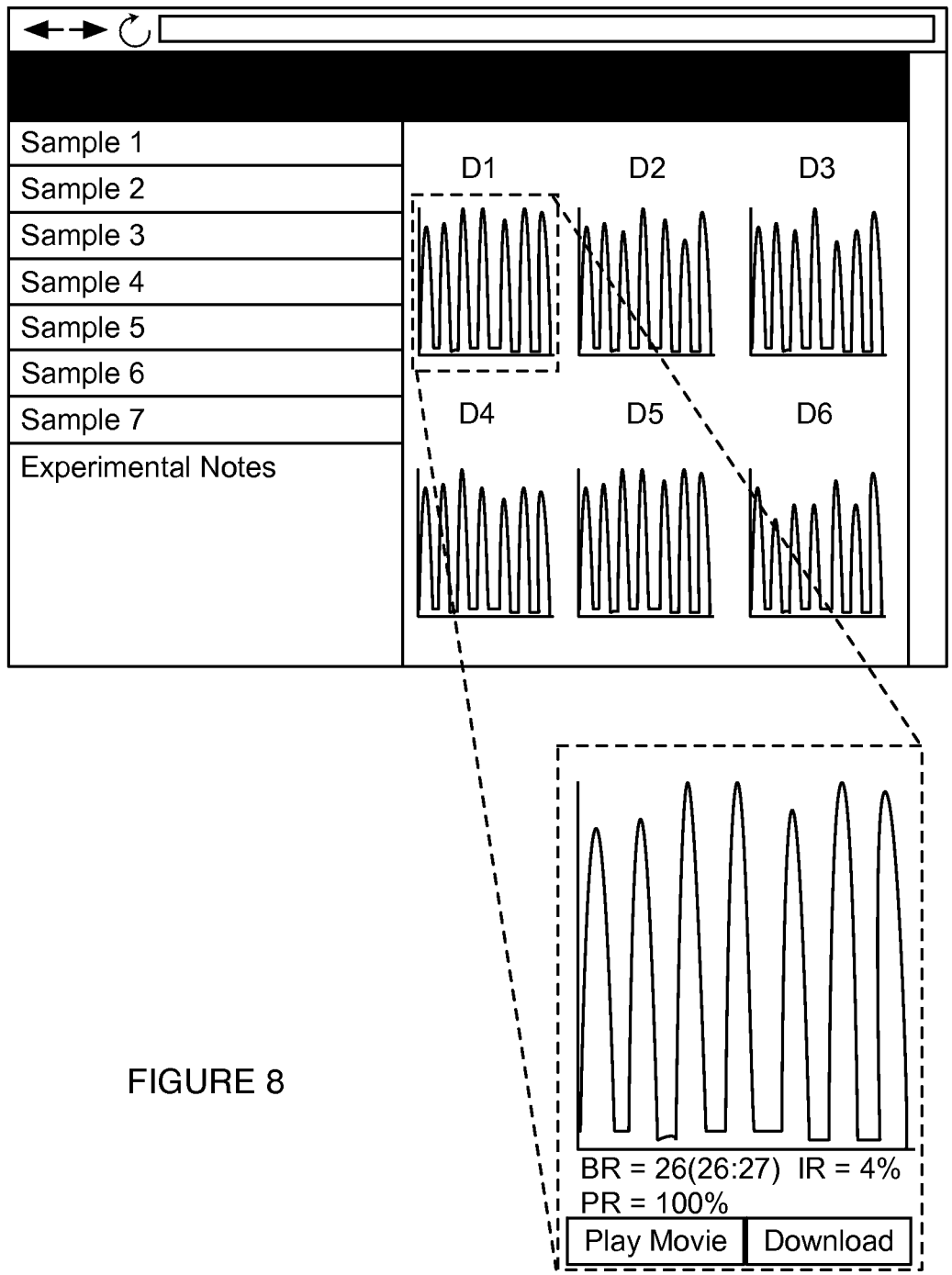
FIG. 8 depicts an example of a portion of a method for characterizing cell motion.

The method 100 can further include any other suitable blocks or steps that facilitate characterization of a cell culture. For instance, the method 100 can include storage of a set of images and/or any element derived from the set of images (e.g. values of motion features, motion signals, etc.) for instance, in a cloud-based storage module and/or a memory-based storage module. Additionally or alternatively, the method 100 can include providing a transmission to an entity, wherein the transmission can include any one or more of: a rendering derived from the set of images or a subset of set of images (e.g., a rendering of identified cell subpopulations, a rendering of motion regions in a cell culture, a rendering of non-motion regions in a cell culture), a video derived from the set of images or a subset of the set of images (e.g., a video of motion of a cell subpopulation, a video of a cell culture), a rendering or a video of multiple cell cultures, a rendering of a motion signal, one or more values of one or more motion features derived from a motion signal, an analysis derived from values of one or more motion features, an indication of a status of a cell culture (e.g., an indication of confluence, an indication of contamination, an indication of abnormalities, etc.) and any other suitable transmission. The transmission can be provided substantially in real time and continuously, but can alternatively be provided in non-real time and/or non-continuously. The entity can be a human entity (e.g., researcher, clinician, etc.) and/or a non-human entity. Furthermore, in variations, the transmission can be provided at an electronic device (e.g., a mobile device, a tablet, a personal computer, a smart watch, etc.), for instance, by way of a web browser client or an application executing at the electronic device, as shown in FIG. 8.

Additionally, as a person skilled in the field of sample imaging will recognize from the previous detailed description and from the figures and claims, modifications and changes can be made to the embodiments, variations, examples, and specific applications of the method 100 described above without departing from the scope of the method 100

2. System

Figure 9:
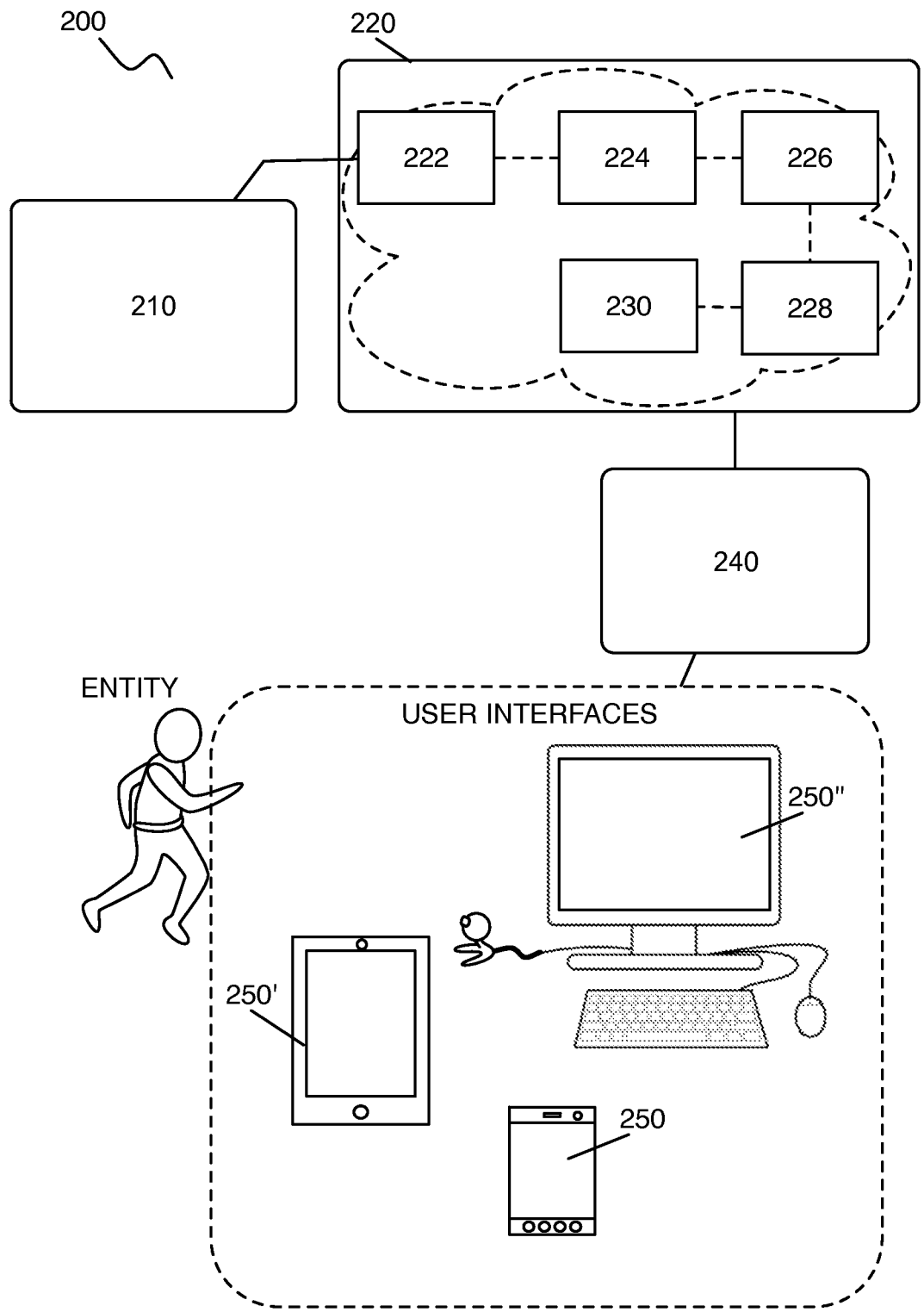
FIG. 9 depicts an embodiment of a system for characterizing cell motion.

As shown in FIG. 9, a system 200 for characterizing cell motion and facilitating cell culture monitoring by a user includes: an imaging module 210 configured to generate an image dataset corresponding to images of the cell culture captured at a set of time points; a processing subsystem 220 in communication with the imaging module 210, including: a first module 222 configured to receive the image dataset, a second module 224 configured to segment, from at least one image of the image dataset, a cell subpopulation from the cell culture, a third module 226 configured to determine a resting signal for the cell subpopulation across a subset of the image dataset, a fourth module 228 configured to generate a single-peak motion signal based upon the image dataset, the set of time points, and the resting signal, and a fifth module 230 configured to determine values of a set of motion features of the cell subpopulation, based upon at least one of the multi-peak motion signal and the single-peak motion signal, and the set of time points, thereby characterizing cell motion; and a transmission module 240 coupled to the processor 220 and configured to transmit values of the set of motion features and video data derived from the image dataset to a mobile device 250 of the user.

The system 200 functions to characterize parameters of cell populations in culture, and to enable phenotypic expressions of a portion and/or an entirety of a cell culture to be assessed over time. The system 200 preferably enables multiple cell subpopulations within each of a set of cell cultures to be assessed; however, the system 200 can additionally or alternatively facilitate characterization of any suitable portion of any number of cell cultures. The system 200 can further allow responses of cell cultures to experimentally applied conditions (e.g., exposure to doses of therapeutic substances) to be assessed at a subpopulation level. Preferably, the system 200 is non-invasive (e.g., cells can be cultured and analyzed without requiring additional treatments due to interaction with the system), and is automated and scalable (e.g., the system can accommodate multiple culture substrates and include actuation). Furthermore, the system 200 preferably enables cell characterization without direct measurement of electrophysiological potentials, but can additionally or alternatively include validation of characterization using a microelectrode array (MEA) system, a patch clamp system, and/or any other suitable system.

In a specific application the system 200 generates and/or receives input data comprising low-light phase-contrast microscopy images of cardiomyocytes in culture. The input data is then processed using computer vision techniques to generate a motion signal of at least one cell subpopulation of a cell culture, wherein the motion signal can be further processed to extract values of a set of motion features. In the specific application, the system 200 can thus characterize beating motion of cultures of cardiomyocytes (e.g., patient-sourced iPSC-derived cardiomyocytes) at a subpopulation level, wherein parameters related to cardiovascular disease (e.g., arrhythmia) or cardiotoxicity are highly relevant. In variations of the specific application, the cardiomyocytes can be patient sourced or sourced from any other suitable donor, and/or can be cultured with any suitable factor configured to induce a cellular response. However, the system 200 can additionally or alternatively be adapted for characterization of motion in one or more tissue samples. The system 200 preferably implements at least a portion of the method 100 described in Section 1 above, which can enable cell cultures to be monitored remotely and characterized automatically; however, the system 200 can additionally be configured to perform any other suitable method.

Figure 10:
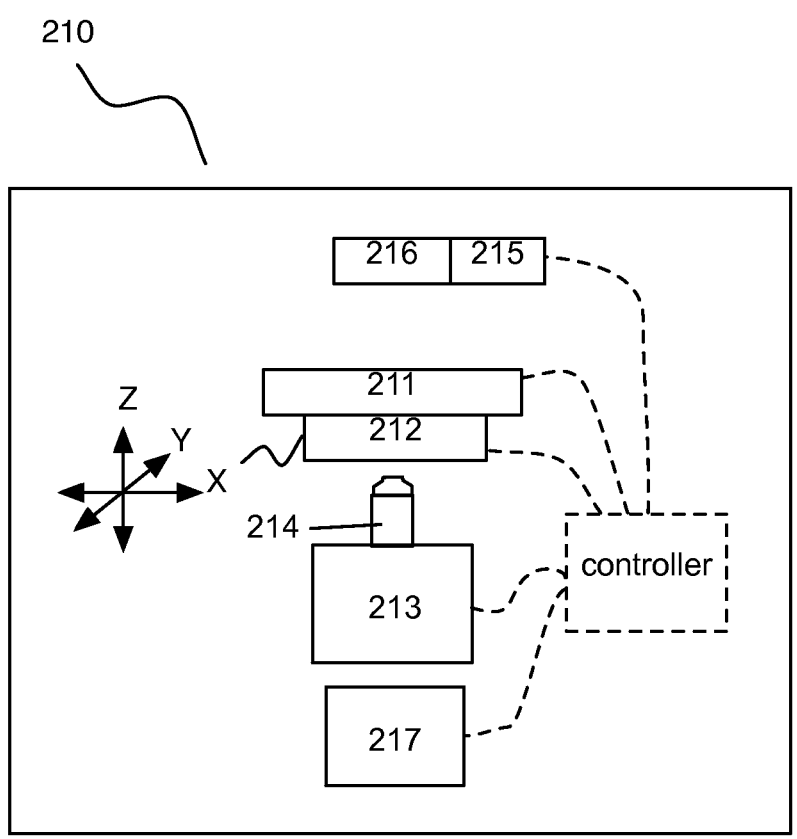
FIG. 10 depicts a variation of a portion of a system for characterizing cell motion.

The imaging module 210 is configured to generate an image dataset corresponding to images of the cell culture captured at a set of time points, and functions to generate data from which cell motion in a cell culture can be characterized. The imaging module 210 can be a microscopic imaging module, and in one variation, can be configured for phase-contrast microscopy (e.g., digital inverted phase contrast microscopy). The imaging module 210 can, however, be additionally or alternatively configured for any other suitable type of microscopy (e.g., fluorescence microscopy, brightfield microscopy, darkfield microscopy, etc.). The imaging module can, for example, image Calcium signaling within a cell culture (e.g., cardiomyocyte cultre) by fluorescence microscopy. As shown in FIG. 10, the imaging module 210 preferably includes a platform 211 configured to receive at least one cell culture, an optics subsystem 213 configured to facilitate light transmission to and from at least one cell culture at the platform 211, an illumination module 215 configured to transmit light through the optics subsystem 213 toward the at least one cell culture at the platform 211; and an optical sensor 217 configured to detect light from at least one cell culture at the platform 211. Imaging by the imaging module 210 can be performed at least in an automated manner, but can additionally or alternatively be implemented in a manual manner. In one example application, a set of imaging parameters specified by an operating entity (e.g., a human entity, a software entity) can direct imaging of the cell culture(s) by the imaging module 210 (e.g., by way of a controller), wherein the controller transitions elements of the imaging module 210 into alignment to properly capture desired windows of view. In the example application, the set of imaging parameters can include any one or more of: type of culture substrate, number and locations of samples per culture substrate, frame rate of capture, duration of image capture per field of view, number of repetitions of image capture, and duration of time elapsed between successive repetitions of image capture. As such, the imaging system 210 can be configured to image multiple cell cultures and/or portions of cell cultures in sequence, in an automated or semi-automated manner.

The platform 211 functions to receive and align at least one cell culture with at least a portion of the optics subsystem 213, and can include or be coupled to a platform control module 212 configured facilitate positioning of the platform or a cell culture relative to other elements of the system 200. The platform 212 preferably includes at least one guide that enables positioning of a culture substrate relative to the platform, but can additionally or alternatively include any other element that facilitates positioning of a culture substrate relative to the platform 211. Preferably, the platform 211 can receive a multi-well culture substrate (e.g., 6-well plate, 12-well plate, 24-well plate, 48-well plate, 96-well plate, slide, etc.), but can additionally or alternatively be configured to receive any other suitable culture substrate. The platform 211 can include an incubator configured to facilitate control of environment (e.g. $CO_2$ levels, $O_2$ levels) and/or temperature regulation (e.g., with a heating module and a temperature sensor), but can additionally or alternatively be configured to operate without coupling to an incubator. The platform control module 212 can enable translation and/or rotation of the platform 211 along any suitable number of paths (e.g., linear paths, rotational paths, etc.). Furthermore, the platform control module 212 can be automatically and/or manually controlled. The platform can also include electrodes to stimulate (e.g., excite or pace) the cell culture(s) (e.g., cardiomyocyte cell cultures). Other variations of the system 200 can, however, include any suitable number of platforms and/or control modules configured in any other suitable manner.

The optics subsystem 213 includes at least one lens 214 configured to provide focusing and/or magnification, and functions to enable a culture substrate including a cell culture to be properly focused and imaged. The lens 214 of the optics subsystem can include one or more phase objectives configured to provide a suitable magnification to image an object of interest of a cell culture. In one example, the lens 214 is a phase objective that provides 10× magnification; however, any other suitable magnification can be provided (e.g., 5×, 20×, 40×, etc.). The optics subsystem 213 is preferably aligned with the illumination module 215, but can additionally or alternatively include any suitable light directing elements (e.g., light splitting elements, light diverting elements, mirrors, etc.) configured to direct light into alignment with other elements of the system 200. Furthermore, the optics subsystem 213 can include any suitable filter (e.g., excitation filter, emission filter, etc.) configured to condition light transmitted to a cell culture and/or light received from the cell culture.

The illumination module 215 functions to provide illumination to facilitate imaging of at least one cell culture at the platform 211. As such, the illumination module 215 includes a light source 216 configured to transmit light, which may or may not be directed through the optics subsystem 213 toward a cell culture at the platform 211. The light source can provide substantially a single wavelength of light (e.g., a nominal wavelength with any suitable tolerance), but can alternatively provide multiple wavelengths of light, which can be filtered to provide a desired wavelength. In variations wherein a single wavelength of light is provided, the light can be coherent or non-coherent light. In one example, the light source 216 can be a red light emitting diode configured to provide light at a wavelength of 625 nm; however, any other suitable light source can be included in the illumination module 215. Furthermore, the system 200 can include any suitable number of illumination modules and/or light sources configured in any other suitable manner.

The optical sensor 217 is configured to detect light from at least one cell culture at the platform 211, and functions to facilitate generation of the image dataset. The optical sensor 217 can include any one or more of: a complementary metal-oxide semiconductor (CMOS) sensor, a charge coupled device (CCD) sensor, a N-type metal oxide semiconductor (NMOS) sensor, and any other suitable sensor. The optical sensor 217 is preferably configured to capture image data at a frame rate and resolution suitable to capture motion of cells of the cell culture, and in a specific example, can be configured to capture images at a rate of 24 frames/second at a resolution of 640×480 pixels. However, any other suitable frame rate of capture and/or resolution can be provided using the optical sensor 217. The optical sensor 217 can further be coupled to a data link (e.g., wireless data link, wired data link, etc.) configured to transmit image data generated at the optical sensor 217. In some variations, the optical sensor 217 can be situated superior to the platform 211, inferior to the platform 211, and/or in any other suitable configuration relative to the platform 211. Furthermore, the system 200 can include any suitable number of optical sensors 217 configured in any other suitable manner relative to other elements of the system 200.

Variations of the system 200 can, however, incorporate any other suitable module configured to generate data that enable characterization of cell motion. For instance, modules that provide data not characterized as image data can be generated and analyzed in some variations of the system 200.

The processing subsystem 220 is configured to be in communication with the imaging module 210, and is preferably configured to perform at least a portion of the method 100 described in Section 1 above. The processing subsystem 220 is preferably implemented in one or more computing systems, wherein the computing system(s) can be implemented at least in part in the cloud and/or as a machine (e.g., computing machine, server, etc.) configured to receive a computer-readable medium storing computer-readable instructions. In one application, a module of the processing subsystem 220 can be implemented in a machine configured to interface directly with the imaging module (e.g., using a wired or a wireless connection) to receive the image dataset, and transfer the image dataset to a cloud-based computing system configured to perform a majority of an embodiment of the method 100 described above. This configuration can facilitate processing and analysis of large datasets, such as those generated during imaging at a high frame-rate for a large number of samples. In one such example, an experiment with a 12-well culture substrate including four samples per well, with image capture occurring at a 24 frames/second frame rate for 30 frames per sample can produce an image dataset on the order of 10,000-100,000 frames, which is more amenable to processing in a cloud-based computing system. However, the processing subsystem can alternatively be configured in any other suitable manner.

The processing subsystem can include: a first module 222 configured to receive the image dataset generated at the imaging module 210, a second module 224 configured to segment, from at least one image of the image dataset, a cell subpopulation from the cell culture, a third module 226 configured to determine a resting signal for the cell subpopulation across a subset of the image dataset, with an associated reference image, a fourth module 228 configured to generate a single-peak motion signal based upon the image dataset, the set of time points, and the resting signal, and a fifth module 230 configured to determine values of a set of motion features of the cell subpopulation, based upon at least one of the multi-peak motion signal and the single-peak motion signal, and the set of time points, thereby characterizing cell motion.

In one variation, as described briefly above, the first module 222 can be implemented in a machine configured to interface directly with the imaging module (e.g., using a wired or a wireless connection) to receive the image dataset, and to transfer the image dataset to the second module 224, which is implemented in a cloud-based computing system. In this variation, the third module 226, the fourth module 228, and the fifth module 230 can also be implemented in the cloud. However, in other configurations of the processor, the modules can be configured in any other suitable manner. Furthermore, the processor can, however, include any other suitable module(s) configured to enrich outputs provided to another entity. For instance, the processing subsystem 220 can include a module configured to generate an analysis derived from an output of any one or more of the first through the fifth modules 222, 224, 226, 228, 230, a module configured to detect outliers, and/or a module configured to validate an output of any suitable module.

The transmission module 240 is configured to couple to the processing subsystem 220 and to transmit values of the set of motion features and video data derived from the image dataset to a mobile device 250 of the user. As such, the transmission module 240 can be configured to provide an output that can be provided to the user, by way of a native application or web browser page executing at the mobile device of the user. In examples, the mobile device 250 can be a smart phone, a tablet 250', a smart watch, and/or any other suitable mobile device. Furthermore provision of an output of the processer 220 can allow an entity (e.g., a research associated with the cell culture(s)) to perform any one or more of: viewing raw image data, making and viewing video derived from the image data (e.g., in real time, in non-real time, continuously intermittently, with playback control, etc.), analyzing data, viewing analyses derived from processing of image data, downloading data and/or video, annotating any suitable output of the processing subsystem 220, and/or performing any other suitable function or manipulation operation. Additionally or alternatively, the transmission module 240 can be configured to transmit any suitable output of the processor 220 to an electronic device of an entity, wherein the electronic device includes a user interface configured to provide access to information derived from the processor 220. In one example, the transmission module 240 can be configured to transmit an output that can be rendered at a website user interface 250", such that an entity (e.g., researcher associated with the cell culture(s)) has access to and/or can manipulate at least one output of the processing subsystem 220.

Variations of the preferred method 100 and system 200 include any combination or permutation of the described components and processes. Furthermore, various processes of the preferred method can be embodied and/or implemented at least in part in the cloud and/or as a machine configured to receive a computer-readable medium storing computer-readable instructions. The instructions are preferably executed by computer-executable components preferably integrated with one or more portions of a controller and/or processor 220. The computer-readable medium can be stored in the cloud and/or on any suitable computer readable media such as RAMs, ROMs, flash memory, EEPROMs, optical devices (CD or DVD), hard drives, floppy drives, or any suitable device. The computer-executable component is preferably a general or application specific processor, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for characterizing cell motion, comprising:
receiving image data corresponding to a set of images of a cardiomyocyte culture captured at a set of time points;
performing a time-domain-based determination of a multi-peak motion signal for a cardiomyocyte subpopulation of the cardiomyocyte culture, across a subset of the set of images;
generating a comparison between values of the multi-peak motion signal and a threshold condition;
determining a resting signal with an associated reference image for the cardiomyocyte subpopulation, based upon the comparison, across a subset of the set of images, wherein determining the resting signal includes identifying a subset of resting-state images from the set of images, wherein a resting-state image has a high similarity to an immediately adjacent image in the set of images;
determining a single-peak motion signal based upon the set of images, the set of time points, and the reference image; and
determining values of a set of beating features of the cardiomyocyte subpopulation, based upon at least one of the multi-peak motion signal and the single-peak motion signal, and the set of time points, thereby characterizing cell motion, wherein the set of beating features includes at least one of: a beating duration, a beating frequency, and a beating irregularity.

2. The method of claim 1, including segmenting one or more beating subpopulations of the cardiomyocyte culture, wherein segmenting comprises:
constructing a variation mask defining a standard deviation of image intensities for each location of a set of locations of the cardiomyocyte culture and captured within the set of images;
constructing a foreground mask from a single image in the set of images; and
segmenting at least one beating region of the cardiomyocyte culture, based upon an intersection between the foreground mask and the variation mask.

3. The method of claim 1, further including, after segmenting the cardiomyocyte subpopulation from the cardiomyocyte culture based on similarity between individual cardiomyocytes of the cardiomyocte subpopulation, clustering the cardiomyocyte subpopulation with at least one other cardiomyocyte subpopulation based upon at least one of the single-peak motion signal and a value of the set of beating features, wherein clustering includes determining a set of motion signals corresponding to a set of beating regions segmented from the cardiomyocyte culture, representing each beating region of the set of beating regions with a descriptor vector based upon the set of motion signals; and performing a hierarchical clustering process based upon determination of pairwise distances between beating regions of the set of beating regions and the descriptor vector for each beating region.

4. The method of claim 1, wherein determining the multi-peak motion signal includes forming a set of arrays of pixel intensities from the set of images, each array associated with a time point of the set of time points, and performing a correlation coefficient operation for successive arrays in the set of arrays of pixel intensities.

5. The method of claim 1, wherein the method further includes detrending the single-peak motion signal by performing a polynomial fit to the resting signal and subtracting the polynomial fit from the single-peak motion signal.

6. The method of claim 1, further including characterizing a response of the cardiomyocyte culture to a chemical factor comprising a drug dosage, based upon determination of values of at least one of the beat duration, the beating frequency, and the beating irregularity corresponding to conditions with and without the chemical factor.

7. A method for characterizing cell motion, comprising:
receiving image data corresponding to a set of images of a cell culture captured at a set of time points;
segmenting, from at least one image of the set of images, the cell subpopulation from the cell culture;
determining a resting signal with an associated reference image for a cell subpopulation of the cell culture, based upon a time domain-based determination of a multi-peak motion signal for the cell subpopulation, across a subset of the set of images;
determining a single-peak motion signal based upon the set of images, the set of time points, and the reference image; and
determining values of a set of motion features of the cell subpopulation, based upon at least one of the multi-peak motion signal and the single-peak motion signal, and the set of time points, thereby characterizing cell motion; and
after segmenting the cell subpopulation from the cell culture, clustering the cell subpopulation with at least one other cell subpopulation based upon at least one of the single-peak motion signal and a value of the set of motion features.

8. The method of claim 7, further including, clustering the cell subpopulation with at least one other cellsubpopulation based upon at least one of the single-peak motion signal and a value of the set of motion features, wherein clustering includes determining a set of motion signals corresponding to a set of motion regions segmented from the cell culture, representing each motion region of the set of motion regions with a descriptor vector based upon the set of motion signals; and performing a hierarchical clustering process based upon determination of pairwise distances between motion regions of the set of motion regions and the descriptor vector for each motion region.

9. The method of claim 7, wherein determining the multi-peak motion signal includes forming a set of arrays of pixel intensities from the set of images, each array associated with a time point of the set of time points, and performing a correlation coefficient operation for successive arrays in the set of arrays of pixel intensities.

10. The method of claim 7, wherein: determining the resting signal includes identifying a subset of resting-state images from the set of images, wherein a resting-state image is similar to an immediately adjacent image in the set of images; wherein determining the resting signal includes identifying a set of indices of at least one of the multi-peak motion signal and the single-peak motion signal corresponding to the subset of resting-state images.

11. The method of claim 7, wherein determining values of the set of motion features includes parameterizing the single-peak motion signal with a multivariate Gaussian mixture model, determining timepoints corresponding to a set of local maxima of the single-peak motion signal, determining a frequency array based upon timepoints corresponding to the set of local maxima, and extracting values of motion frequency from the frequency array.

12. The method of claim 7, further including characterizing a response of the cell culture to a culture environment factor, including at least one of a chemical factor, a mechanical factor, and an electrical simulation factor, based upon determining additional values of at least one of the set of motion features corresponding to provision of the culture environment factor.

13. The method of claim 12, wherein characterizing the response of the cell culture to the culture environment factor includes characterizing the response of a cardiomyocyte culture to a drug dosage, based upon determination of values of at least one of a beat duration, a beating frequency, and a beating irregularity corresponding to conditions with and without the drug dosage.

14. A system for characterizing cell motion of a cell culture and facilitating cell culture monitoring by a user, comprising:
   an imaging module configured to generate an image dataset corresponding to images of the cell culture captured at a set of time points;
   a processing subsystem in communication with the imaging module, including:
      a first module configured to receive the image dataset,
      a second module configured to segment, from at least one image of the image dataset, a cell subpopulation from the cell culture,
      a third module configured to determine a resting signal with an associated reference image for the cell subpopulation based upon a comparison of values of the multi-peak motion signal and the threshold condition, across a subset of the image dataset,
      a fourth module configured to determine a single-peak motion signal based upon the image dataset, the set of time points, and the reference image, and
      a fifth module configured to determine values of a set of motion features of the cell subpopulation, based upon at least one of the multi-peak motion signal and the single-peak motion signal, and the set of time points, thereby characterizing cell motion; and
   a transmission module coupled to the processor and configured to transmit values of the set of motion features to a device of the user.

15. The system of claim 14, wherein the imaging module is a phase-contrast microscopy module including a platform configured to receive the cell culture, an optics system configured to transmit light to and from the cell culture at the platform, a red light source configured to transmit light through at least a portion of the optics system, and an optical sensor configured to capture the image dataset of the cell culture.

16. The system of claim 14, wherein the imaging module includes a controller configured to facilitate image capture by the optical sensor at a frame rate of at least 24 frames per second, and a platform control module in communication with the controller configured to facilitate image capture from each of a set of cell cultures at the platform in succession.

17. The system of claim 14, wherein the first module of the processing subsystem is implemented in a machine coupled to the imaging module, and wherein the second module, the third module, the fourth module, and the fifth module of the processing subssytem are implemented in a cloud-based computing system.

18. The system of claim 17, wherein the fifth module of the processing subsystem is configured to determine a set of values of a beating duration as assessed by a beat duration, a beating frequency, and a beating irregularity.

19. The system of claim 18, wherein the transmission module is configured to transmit at least one of: a video of the cell culture, a rendering of the single-peak motion signal, and a report of the set of measurement values derived at the processing subsystem, to the device.

* * * * *